United States Patent

Woelk

[15] 3,660,004

[45] May 2, 1972

[54] PALLET CLAMP

[72] Inventor: Robert J. Woelk, Alpena, Mich.

[73] Assignee: Besser Company, Alpena, Mich.

[22] Filed: Apr. 30, 1970

[21] Appl. No.: 33,248

[52] U.S. Cl. .............................................. 25/41 R, 425/432
[51] Int. Cl. ........................................................... B28b 7/00
[58] Field of Search .................. 25/2, 41 R, 41 J, 41 D, 41 L, 25/119, 121 R; 249/139; 18/43; 1/30 LA

[56] References Cited

UNITED STATES PATENTS

| | | | |
|---|---|---|---|
| 1,524,877 | 2/1925 | Norton...................................... | 25/2 X |
| 2,342,440 | 2/1944 | Waitsitt.................................... | 25/41 J |
| 3,199,159 | 8/1965 | Wernecke........................ | 18/30 LA X |

Primary Examiner—Robert D. Baldwin
Assistant Examiner—Norman E. Lehrer
Attorney—Learman, Learman & McCulloch

[57] ABSTRACT

Concrete block molding machinery having apparatus for moving a block receiving pallet against a mold assembly which is used in forming building blocks. The apparatus includes rotatable clamp arms and clamp receiving members having cooperating wedging surfaces, the clamp arms being movable into and out of engagement with the clamp receiving members to move the pallet supporting members toward and away from the mold assembly to clamp and unclamp the pallet to and from the mold.

13 Claims, 5 Drawing Figures

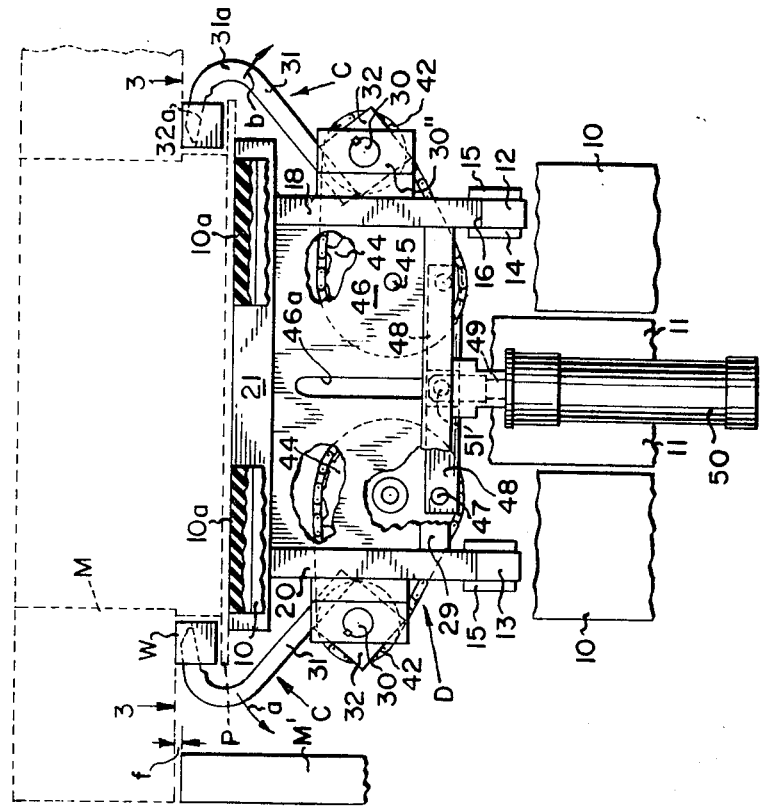

INVENTOR
ROBERT J. WOELK

PALLET CLAMP

This invention relates to pallet clamps for use with concrete block molding machinery and more particularly to apparatus for clamping a block receiving pallet to a mold assembly for preventing leakage of the molding material therebetween when a block is being formed in the mold assembly.

Block supporting pallets have been provided in the past for the purpose of supporting the blocks while they are being formed in addition to facilitating the handling thereof. In conventional block molding machinery, apparatus is provided for simultaneously vibrating a mold assembly box and the pallet on which the blocks are molded to assure proper set of the material and remove the voids therefrom. During this vibration period, the mold assembly and pallet tend to separate during each cycle of vibration which allows leakage of cementitious material therebetween, thus resulting in irregularly sized blocks having rough edges.

It is an object of the present invention to provide apparatus for maintaining physical contact between the pallet on which an article is vibration formed and the mold ring in which the article is formed during the vibration period of formation.

Another object of the present invention is to provide pallet clamp apparatus for clamping a block receiving pallet to mold apparatus for forming building blocks.

It is a further object of the present invention to provide a first support member for removably clamping a pallet to a vibrated mold assembly and a second resilient support member for resiliently supporting the pallet when the pallet and the first support member are in the clamped condition to isolate the vibration.

Briefly, in accordance with the present invention, there is provided apparatus for clamping a block receiving pallet to a mold means utilized in forming building blocks including pallet support means for supporting a pallet adjacent the mold means, clamp means mounted on one of the pallet support means and mold means, clamp receiving means mounted on the other of said pallet support means and mold means, the clamp and clamp receiving means including cooperating wedge means, and means for moving the clamp means into engagement with the clamp receiving means and exerting a clamping force between the cooperating wedge means to clamp the pallet tightly against the mold means.

Other objects and advantages of the invention will become apparent from the following description and accompanying drawings, in which:

FIG. 1 is a side elevational view illustrating the apparatus in the clamped condition, parts being broken away in section to more clearly illustrate the invention;

FIG. 2 is an end elevational view of the apparatus in the clamped position, parts being broken away to illustrate the invention more clearly;

Apparatus constructed according to the invention is adapted for use with a mold assembly, illustrated schematically as a mold ring at M, for forming building blocks from plastic material, preferably cementitious material, in a manner more particularly described in the copending application of Thomas W. Springs for Method and Apparatus for Forming Building Blocks, Ser. No. 858,032, filed Sept. 15, 1969, assigned to the assignee of the present invention, and incorporated herein by reference. The bottom of the mold M is formed by a removable, imperforate pallet member P on which the blocks are formed to facilitate handling thereof upon their ejection from the mold M. Vertical Vibratory motion is imparted to the mold box M in the normal manner through connecting rods R from a suitable vibrating mechanism schematically illustrated at V (FIG. 2).

Figure 4:
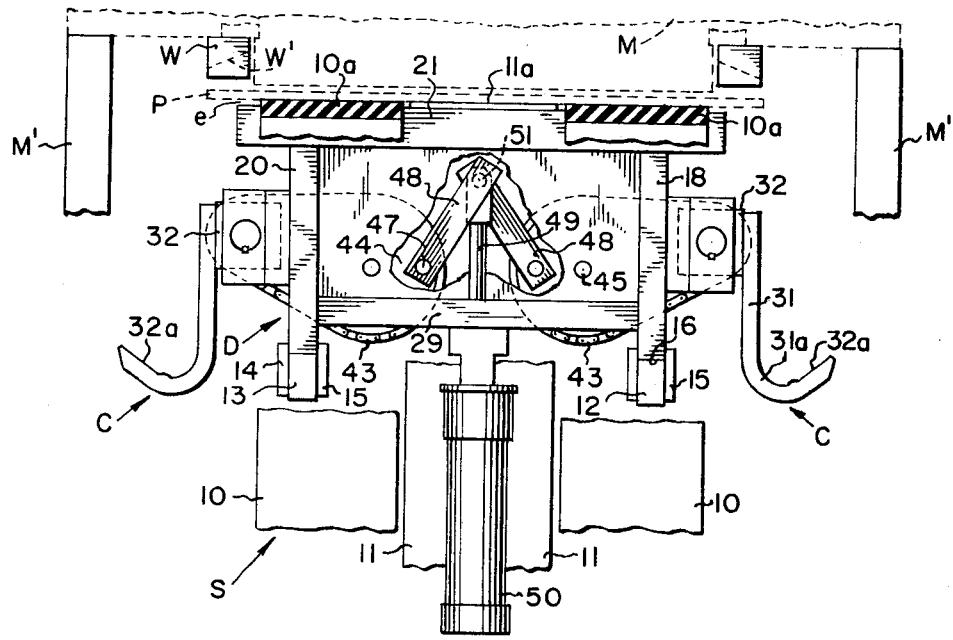
FIG. 4 is a view similar to FIG. 1 illustrating the apparatus in the unclamped and slightly lowered position.

In the unclamped position as shown in FIG. 4, the pallet member P is supported on pallet support apparatus, generally designated S, which includes front and rear pairs of longitudinally spaced apart support posts 10 having resilient members 10a mounted on the upper ends thereof for supporting the pallet P. The support apparatus S also includes a pair of additional support posts 11 disposed between the front and rear pairs of posts 10 and including resilient members 11a mounted at the upper ends thereof for supporting the pallet P. The lower ends of the vertically extending members 10 and 11 are united in a common foundation G which is vertically movable by suitable means such as a pneumatic cylinder, X. When the pallet P rests on the resilient members 10a and 11a in the unclamped condition, as shown in FIG. 4, the mold member M is supported on the machine frame M'. The mold M is capable of vertical vibratory motion relative to the machine frame M'.

Extending laterally inwardly of the support posts 10 is a plurality of horizontally extending support platforms S' which removably mount a pair of longitudinally spaced apart and transversely extending support beams 12 and 13. A pair of vertically extending plates 14 and 15 is mounted on the longitudinally opposed sides of the ends and middle of each beam 12 and 13. The plates 14 and 15 associated with the ends of each beam 12 and 13 extend slightly above the beams 12 and 13 to form a channel 16 therebetween for receiving a pair of vertically extending and transversely spaced apart posts 18 and 20 above the beams 12 and 13, respectively.

Spanning the upper ends of the vertically extending beams 18 and 20 is a pair of laterally spaced apart, longitudinally extending anvils or beams 21 and 22 (FIG. 2) which, in the unclamped position as illustrated in FIG. 4, are slightly spaced a distance $e$ from the underside of the pallet member P. Extending upwardly from the channel 16 formed by the middle set of plates 14 and 15 above the beam 12, as illustrated in FIG. 2, is a pair of vertically extending and laterally spaced apart beams 23 and 24. A similar pair of vertically extending beams 25 and 26 (FIG. 3) is mounted between the center set of plates 14 and 15 above the beam 13. A longitudinally extending beam 27, located generally at the same level as the beams 21 and 22, spans the upper ends of the beams 25 and 26 and the beams 23 and 24. A pair of laterally spaced apart and longitudinally extending cross members 28 and 29 extends between the lower ends of the posts 18 and 20, as shown in FIGS. 1 and 2.

Figure 5:
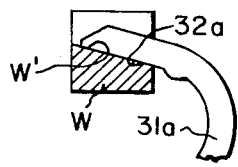
FIG. 5 is an enlarged, fragmentary view illustrating the clamp engaging a wedge block.

For clamping the pallet P to the bottom of the mold M, a pair of laterally spaced apart, hook shaped clamp arms C are movably mounted in opposite directions, as indicated by the arrows $a$ and $b$, by drive apparatus, generally shown at D. The clamp arms C are keyed or otherwise fixed to a pair of longitudinally spaced apart shafts 30. Each shaft 30 is journaled in a pair of bearing blocks 30' and 30" (FIG. 2) which are mounted on the vertically extending members 18 and 20 on longitudinally opposite ends of the machine. Each of the clamp arms C includes a straight portion 31 connected at one end to a shaft mounting member 32 and formed at its other end with a bent over hook portion 31a for engaging wedge blocks W (FIG. 5) fixed to the lower end of the mold assembly M. The hook portions 31a and wedge blocks W have cooperating cam surfaces 32a and W', respectively, for a purpose to be described more fully hereinafter. Each of the shafts 30 also is journaled in a pair of bearing blocks 40 and 41 which are secured to the beams 23, and 24, and the beams 25 and 26 respectively.

A driven sprocket 42 is fixed to each of the shafts 30 and is disposed between the bearing blocks 40 and 41. A larger, longitudinally spaced, driving sprocket 44 is fixed to each of a pair of longitudinally spaced apart shafts 45 which are journaled in a pair of laterally spaced apart walls 46 (FIG. 3) extending between the upwardly extending posts 24, 26, and 23, 25. A pair of driving chains 43 are trained around the sprockets 42 and sprockets 44. If desired, conventional tension adjusting devices (not shown) may be provided to control the tension on the chain members 43.

Figure 3:
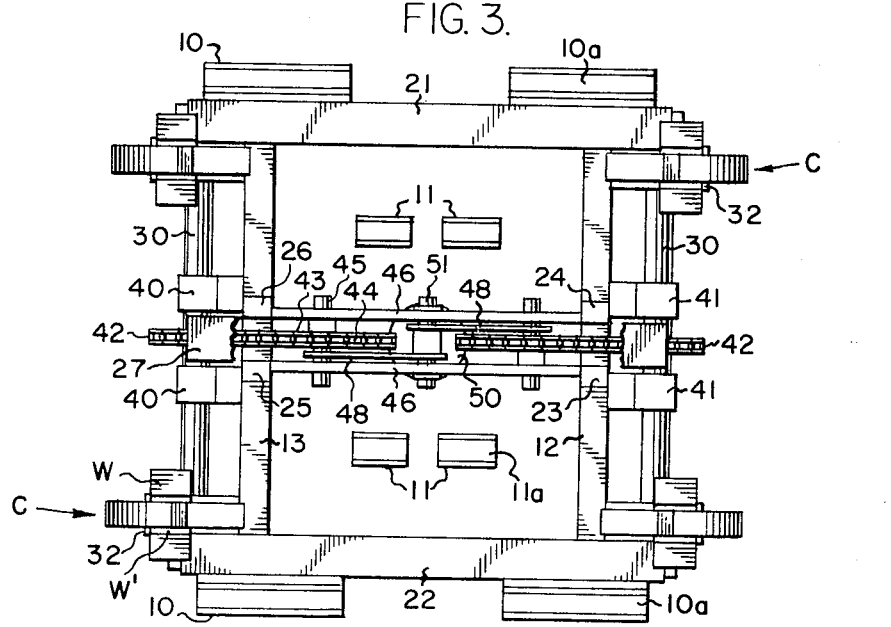
FIG. 3 is a top plan view taken along the line 3—3 of FIG. 1.

Eccentrically mounted on each of the sprockets 44 is a shaft 47 (FIG. 1). Journaled on each shaft 47 is one end of a toggle link 48, the opposite ends of which are pivoted to the free end of a driving piston rod 49 by means of a pin 51. The piston rod is connected to a piston which is reciprocable in a pneumatic or hydraulic cylinder 50. As shown in FIG. 1, each of the vertically extending, spaced apart plates 46 has a vertically extending slot 46a which slidably receives the ends of the pin 51. As best shown in FIG. 3, the links 48 are mounted on laterally opposite sides of the member 49 and extend in longitudinally opposite directions therefrom. The cylinder 50 may be secured to the bottom of the plates 46 in any suitable manner such as welding.

In operation, a pallet P is mounted on the pallet receiver support means S which is raised from a lowered position (not shown) by apparatus which may comprise fluid pressure operated cylinder X so that the pallet P will engage the bottom of the mold M to raise the mold M upwardly so that a distance $f$ (FIG. 1) exists between the mold M and the top of the machine frame M'. In this position the resilient members 10a and 11a will be slightly compressed. Prior to material being introduced into the mold, the cylinder 50 is actuated to lower the piston rod 49 from the position shown in FIG. 4 to the position shown in FIG. 1 so as to extend the links 48 substantially in prolongation of one another. This forces the left and right sprockets 44 to rotate clockwise and counterclockwise respectively, as viewed in FIG. 1 and thus convert the linear motion of the piston rod 49 to rotary motion of the sprockets 44. The rotation of the sprockets 44 is effective to rotate the sprockets 42 to drive the clamp arms C into engagement with the wedge blocks W carried by the mold assembly M. The cam surfaces 32a of the clamp arms C engage the co-operating cam surfaces W' of wedge blocks W. As the clamp arms C are rotated, they are forced upwardly by the wedging action between the surfaces 32a and W'. As the clamp arm C move upwardly, the anvils or beams 21, 22 and 27 are also moved upwardly to engage the pallet member P and clamp it against the bottom of the mold M where it is retained until the period of mold vibration is completed. The interaction between the clamp arms C and the wedge blocks W thus serves to transfer the anvils 21, 22 and 27 from their resting position on the support members S' to a clamping position against the bottom of the pallet P. Thus, a space $h$ (FIG. 2) exists between the top of the support S' and the bottom of the beams 12 and 13, when the pallet is clamped in position for vibration. With the entire assembly now supported on resilient blocks 10a and 11a, vibration forces are isolated.

Upon completion of the vibration period, the cylinder 50 is actuated to drive its piston in the opposite direction to collapse the links 48, as shown in FIG. 4, so that the clamps C are rotated out of engagement with the wedges W, thereby permitting the beams 12 and 13 mounting the anvils 21, 22 and 27 to lower and again be supported on the support members S'. The pallet P thus again rests solely on the resilient members 10a and 11a of the support member S which may thereafter be lowered to lower the pallet and green block formed to a discharge position. When this occurs, the mold M moves downwardly to a support position on the machine frame M'. The pallet with the formed blocks may be removed from the pallet support member S and another empty pallet moved in its place whereafter the cycle may be repeated.

The invention is defined in the claims.

I claim:

1. Apparatus for clamping a block receiving pallet to a mold member for forming concrete blocks comprising:
    a mold member having an open end;
    a pallet support member for removably supporting a pallet adjacent said end of the mold member;
    means for relatively moving the mold member and pallet support member toward and away from each other between remote and operative block-forming position;
    receiver means removably supporting said pallet support member;
    clamp means mounted on one of said members;
    clamp receiving means mounted on the other of said members;
    said clamp and clamp receiving means including cooperating wedging parts having cooperating surface means; and
    drive means for relatively moving said clamp means and said clamp receiving means into wedged engagement to clamp the pallet tightly against said end of the mold member and move said pallet support member in a direction away from said receiver means.

2. Apparatus as set forth in claim 1 wherein said pallet support member is suspended solely from said mold member when said pallet is clamped against said mold member.

3. Apparatus as set forth in claim 1 wherein said drive means is adapted to be connected with a source of linearly reciprocable power and includes means for converting linear motion into rotary motion.

4. Apparatus as set forth in claim 3 wherein said converting means includes rotatable means connected with said clamp means, and linearly reciprocable means for alternately rotating said rotatable means in opposite directions.

5. Apparatus as set forth in claim 4 further including link means connecting said linearly reciprocable means with said rotatable means, said rotatable means including first and second interconnected and longitudinally spaced apart sprockets; one of said sprockets being connected with said link means and the other of said sprockets being connected with said clamp means.

6. Apparatus for clamping a block receiving pallet to a mold member for forming concrete blocks comprising:
    a frame;
    a mold member removably supported on said frame and having an open end;
    pallet support means, including resilient means, for removably resiliently supporting a pallet adjacent said end of said mold member;
    means for moving said pallet support means between a remote position and a position adjacent said mold member to close the open end of said mold member with said pallet and lift said mold member off said frame to resiliently support said pallet and mold member; and
    clamp means removably supported on said pallet support means including clamp members reactable with said mold member to clamp the pallet to said mold member and lift the clamp means off said pallet support means.

7. Apparatus for clamping a block receiving pallet to a mold member for forming blocks comprising:
    a mold member;
    support means, including resilient means, for resiliently supporting a block-receiving pallet positioned against said mold member;
    means for preventing separation of the mold member and pallet removably supported on said support means and movable between a removed inoperative position on said support means and an operative position removed from a support position on said support means in which it prevents said pallet and said mold member from parting;
    means for moving said separation preventing means between said inoperative and said operative positions and for securing said removably supported means in said operative position; and
    means for operating said securing means.

8. Apparatus as set forth in claim 7 wherein said means for moving and for securing includes clamp means mounted on one of said separation preventing means and said mold member, and clamp receiving means mounted on the other of said separation preventing means and said mold member; said operating means including means for moving said clamp means into engagement with said clamp receiving means.

9. Apparatus as set forth in claim 8 wherein said clamp means includes a pair of longitudinally spaced apart clamps pivotally movable on each of a pair of longitudinally spaced apart shafts into and out of engagement with said clamp receiving means between clamped and unclamped positions.

10. Apparatus as set forth in claim 9 wherein said means for operating said securing means comprises first and second pairs of sprockets, each of said pairs including a rotatable driven sprocket connected with one of said clamps, and a rotatable drive sprocket drivingly connected with said driven sprocket, each of said driven sprockets being mounted on a shaft and including an eccentric shaft connected with a linearly reciprocable member, and means for reciprocating said reciprocable member to rotate said drive and driven sprockets to move said clamps between said clamped and unclamped positions.

11. Apparatus as set forth in claim 7 wherein said means for moving and securing includes cooperating wedge means mounted on said removably supported means and said mold member, and said means for operating said securing means includes means for moving said cooperating wedge means into wedging relation.

12. Apparatus for clamping a block receiving pallet to a mold member for forming concrete blocks comprising:
 a pallet
 a mold member;
 a frame structure;
 a support member on said frame structure;
 resilient support means for resiliently supporting one of said pallet and said mold member mounted on said frame structure;
 means for selectively clamping said pallet and said mold member together said clamping means mounted for movement between an inoperative position in which it rests on said support member and a clamping position in which it has moved in a direction away from said support member for clamping said pallet to said mold member so that said pallet, mold member and clamping means are supported by said resilient support means; and
 means for moving said clamping means between said inoperative and clamping positions.

13. The apparatus set forth in claim 12 wherein said clamp moving means is reactable between said mold member and said clamping means.

* * * * *